(12) United States Patent
Cheng

(10) Patent No.: US 8,307,506 B2
(45) Date of Patent: Nov. 13, 2012

(54) ANTI-PINCHING STRUCTURE FOR SUPPORTING FRAME

(75) Inventor: Kang Han Cheng, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 37 days.

(21) Appl. No.: 13/087,536

(22) Filed: Apr. 15, 2011

(65) Prior Publication Data

US 2011/0192954 A1    Aug. 11, 2011

Related U.S. Application Data

(62) Division of application No. 12/273,298, filed on Nov. 18, 2008, now Pat. No. 8,046,874.

(30) Foreign Application Priority Data

Jan. 22, 2008 (TW) .............................. 97102585 A

(51) Int. Cl.
*E05D 11/10* (2006.01)
(52) U.S. Cl. .......... 16/324; 16/349; 16/333; 248/292.13
(58) Field of Classification Search .............. 16/319, 16/321, 322, 323, 324, 326, 327, 328, 331, 16/332, 335, 336, 349, 352, 353, 297, 374, 16/277, 303, 308, 304, 333, 343, 346, 347; 361/679.27, 679.28; 292/137, 163, DIG. 37, 292/DIG. 63; 248/371, 372.1, 292.13, 924; 403/120, 154, 160, 162; 49/462

See application file for complete search history.

(56) References Cited

U.S. PATENT DOCUMENTS

| 105,441 | A | * | 7/1870 | Eccard | 16/343 |
|---|---|---|---|---|---|
| 366,151 | A | * | 7/1887 | Byam | 16/343 |
| 1,520,570 | A | * | 12/1924 | Haynes | 16/343 |
| 2,813,737 | A | * | 11/1957 | Reiter | 292/74 |
| 4,575,896 | A | * | 3/1986 | Nakao et al. | 16/35 R |
| 5,265,969 | A | * | 11/1993 | Chuang | 16/329 |
| 5,409,449 | A | * | 4/1995 | Nebolon | 16/333 |
| 5,465,191 | A | * | 11/1995 | Nomura et al. | 361/679.27 |
| 5,687,944 | A | * | 11/1997 | Shon | 248/349.1 |
| 5,854,735 | A | * | 12/1998 | Cheng | 16/340 |
| 6,034,867 | A | * | 3/2000 | Seo | 16/328 |
| 6,343,406 | B1 | * | 2/2002 | Yeh | 16/328 |
| 6,708,370 | B2 | * | 3/2004 | Shih et al. | 16/332 |
| 6,711,780 | B2 | * | 3/2004 | Lee | 16/326 |
| 7,614,097 | B1 | * | 11/2009 | Cheng | 5/99.1 |
| 2001/0054215 | A1 | * | 12/2001 | Huse | 16/326 |
| 2003/0016489 | A1 | * | 1/2003 | Agata et al. | 361/683 |
| 2003/0037412 | A1 | * | 2/2003 | Lee | 16/326 |
| 2004/0016081 | A1 | * | 1/2004 | Shih et al. | 16/332 |

FOREIGN PATENT DOCUMENTS

TW    M309183    4/2007

* cited by examiner

*Primary Examiner* — Jeffrey O Brien
(74) *Attorney, Agent, or Firm* — Guice Patents PLLC

(57) ABSTRACT

The present invention discloses an anti-pinching structure for supporting frame, in which a slidable or rotatable positioning block is disposed on the hinge portion of the connection base and the supporting framework and a hinge unit is disposed on the hinge portion of the connection base and the supporting framework, such that the torsion spring of the hinge units may form a supporting torsion against the supporting framework and the positioning block may prevent the supporting framework from springing back.

7 Claims, 8 Drawing Sheets

ANTI-PINCHING STRUCTURE FOR SUPPORTING FRAME

RELATED APPLICATIONS

This application is a Division of application U.S. Ser. No. 12/273,298, entitled "ANTI-PINCHING STRUCTURE FOR SUPPORTING FRAME" and filed on Nov. 18, 2008 now U.S. Pat. No. 8,046,874.

FIELD OF THE INVENTION

The present invention relates to an anti-pinching structure for supporting frame and in particular to an anti-pinching structure suitable for preventing the spring back of a supporting framework.

BACKGROUND OF THE INVENTION

"Supporting Structure with Retaining Function," developed by the present inventor, is disclosed in the ROC Patent No. M309183 on Apr. 1, 2007, comprises a base 1, whose top surface is fixedly disposed with a supporting frame 12; a retaining part 2, which may slidingly disposed on the top of the face of the base 1 and which protrudes to form a fastening tenon 25 horizontally; a connecting part 3, whose bottom and top portions have a lower end 31 and upper end 32, respectively, and in which the lower end 31 pivotally connected with the base 1 by a base hinge 5 to form a rotating status and to reach an engaged status by the fastening tenon 25 as well as reach a disengaged status by the transverse sliding of the retaining part 2; and a main frame 4, whose lower end is disposed with a main supporter 41 which is pivotally connected with the upper end 32 of the connecting part 3 by a main hinge 6 to form a rotating status.

However, if the supporting structure is to be simplified into a framework, the springing back of the torsion spring of the hinge of the supporting frame has to be resolved. Otherwise, when the supporting framework is rotated, the supporting framework, under the action of the torsion spring, may pinch an assembly staff or maintenance staff. Thus the aforementioned invention is not conducive to assembling, maintenance, or dismantling.

SUMMARY OF THE INVENTION

The main object of the present invention is to provide an anti-pinching structure for supporting frame, in which a slidable or rotatable positioning block is disposed on the hinge portion of the connection base and the supporting framework and a hinge unit is disposed on the hinge portion of the connection base and the supporting framework, such that the torsion spring of the hinge units may form a supporting torsion against the supporting framework and when the supporting framework is rotated to the positioning point, the positioning block may prevent the supporting framework from springing back.

The major improvement of the present invention lies in the fact that the first fixing base of the supporting framework is disposed with a slidable or rotatable positioning block, which may be inserted into the positioning hole or positioning notch of the side plate of the connection base to prevent the supporting framework from springing back under the action of the torsion spring and which is conducive to assemble and dismantle displayer or other electronic device on the connection base and can avoid pinching maintenance staff during maintaining work.

Another improvement of the present invention lies in the fact that when the supporting framework is folded up, the two protrusions of the second locking piece may constrain the two protrusions of the first locking piece so as to form a locking status; when the supporting framework is spread from the folded status, the two protrusions of the second locking piece may cross the two protrusions of the first locking pieces and thus disengage from the locking status.

An anti-pinching structure for supporting frame according to one preferred embodiment of the present invention comprises: a connection base having two side plates; a supporting framework disposed with a first and second fixing base; a pair of hinge units pivoting the two side plates of the connection base onto the first and second fixing bases, respectively; a cover body fixedly disposed on the first fixing base; a slidable positioning block disposed between the cover body and the first fixing base; wherein the spindle of the hinge units may be insertingly disposed onto the torsion spring and the spring fixing plate, the front end of the torsion spring is embeddedly fixed on the two side plates of the connection base, and the rear end of the torsion spring is embeddedly fixed on the spring fixing plate; when the supporting framework is rotated, the first and second fixing bases may drive the spindle and the spring fixing plate to rotate; and when the supporting framework is rotated to the positioning point, the tip portion of the positioning block is pushed into the positioning hole of the side plates of the connection base, so as to prevent the supporting framework from springing back.

An anti-pinching structure for supporting frame according to another preferred embodiment of the present invention comprises: a connection base having two side plates; a supporting framework disposed with a first and second fixing base; a pair of hinge units pivoting the two side plates of the connection base onto the first and second fixing bases, respectively; a rotatable positioning block pivoted onto the first fixing base; wherein the spindle of the hinge units may be insertingly disposed onto the torsion spring and the spring fixing plate, the front end of the torsion spring is embeddedly fixed on the two side plates of the connection base, and the rear end of the torsion spring is embeddedly fixed on the spring fixing plate; when the supporting framework is rotated, the first and second fixing bases may drive the spindle and the spring fixing plate to rotate; and when the supporting framework is rotated to the positioning point, the positioning block is poked and thus the protrusion of the positioning block is inserted into the positioning notch of the first fixing base and the positioning notch of the side plate of the connection base so as to prevent the supporting framework from springing back.

BRIEF DESCRIPTION OF THE DRAWINGS

The present invention can be more fully understood by reference to the following description and accompanying drawings, in which.

DETAILED DESCRIPTION OF THE INVENTION

Figure 1:
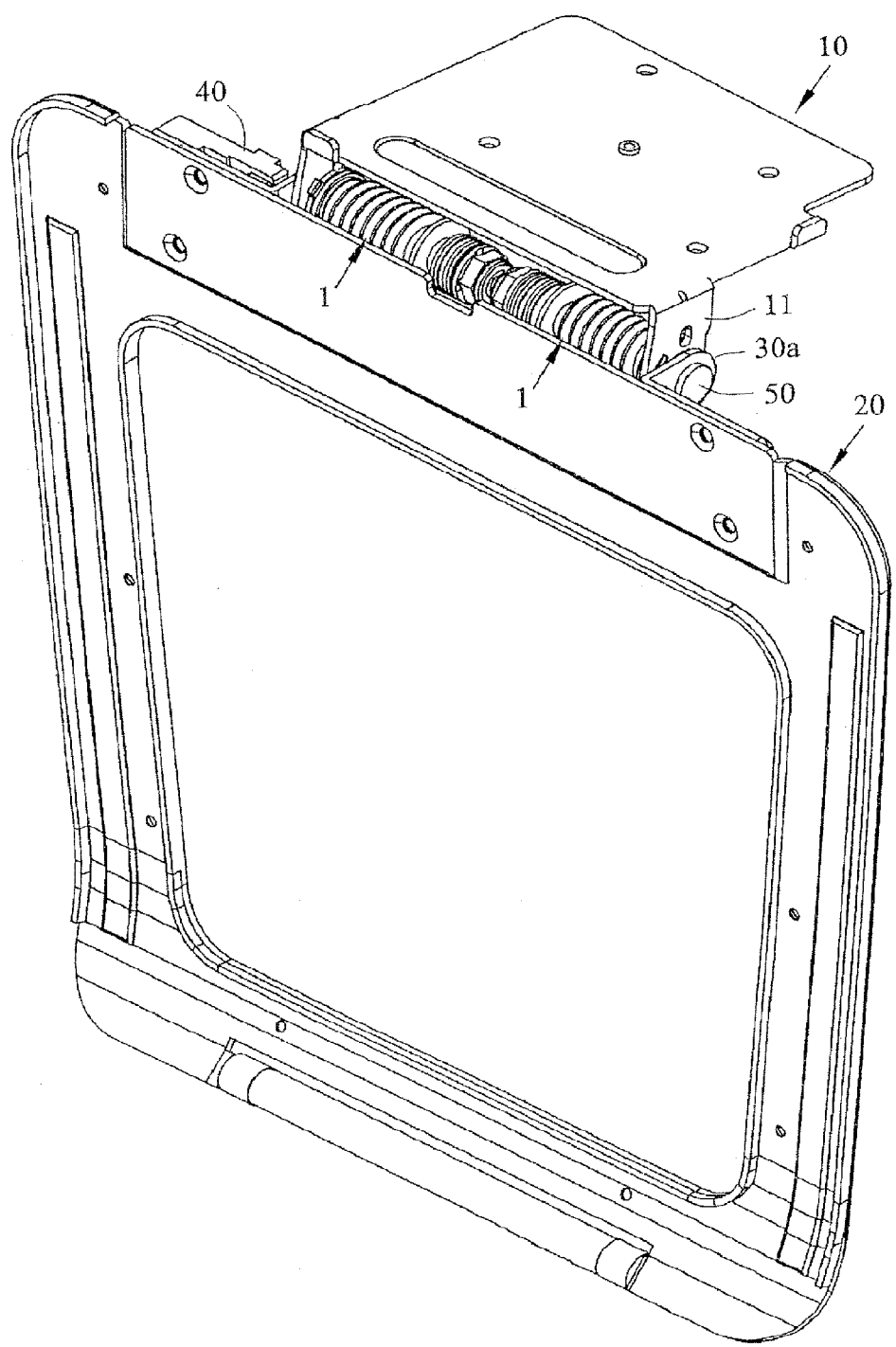
FIG. 1 is a perspective assembly view of the one preferred embodiment of the present invention.

Referring to the accompanying drawings, embodiments of the present invention will be explained in detail.

With reference to FIGS. 1 to 5, according to one preferred embodiment of the present invention, an anti-pinching structure for supporting frame is disposed between a connection base 10 and a supporting framework 20, comprising a first fixing base 30, a cover body 40, a positioning block 42, a spindle 50, a first locking piece 60, a second locking piece 70, a spring fixing plate 80, a torsion spring 90; the fixing base 30 is fixedly disposed on the supporting framework 20 and the through hole 31 of the fixing base 30 has at least a side edge 32; the cover body 40 fixedly disposed on the fixing base 30 and has a guide slot 41; the positioning block 42 disposed between the fixing base 30 and the cover body 40 may slide along the guide slot 41; the spindle 50 disposed with at least a flat surface 51 may be insertingly disposed on the fixing base 30 and the side plates 11 of the connection base 10; the first locking piece 60 has a round hole 61 for the insertion of the spindle 50 and a fixed end 62 to be embeddedly fixed on the side plates 11 of the connection base 10; the second locking piece 70 is insertingly disposed on the spindle 50 and the through hole of the second locking piece 70 has at least a side edge 72; the spring fixing plate 80 is insertingly disposed onto the spindle 50 and the through hole 81 of the spring fixing plate 80 has at least a side edge 82; the sleeve 84 is insertingly disposed on the spindle 50 and positioned between the second locking piece 70 and the spring fixing plate 80; the torsion spring 90 is insertingly disposed on the sleeve 84, and the front end 91 and rear end 92 of the torsion spring 90 are embeddedly fixed, respectively, on the fixing slot 13 of the side plate 11 and on the fixing slot 83 of the spring fixing plate 80; wherein the end of the spindle 50 may be insertingly disposed with a resilient element 52 and be tighten with a nut 53, and the resilient element 52 may impel the spring fixing plate 80 and sleeve 84 to prompt the second locking piece 70 to intimately contact with the first locking piece 60; consequently, when the supporting framework 20 is folded, the two protrusions 73 of the second locking piece 70 may constrain the two protrusions 63 of the first locking piece 60 so as to form a locking status; when the supporting framework 20 is spread from the folded status, the protrusions 73 of the second locking piece 70 may cross the protrusions 63 of the first locking pieces 60 and thus disengage from the locking status and the torsion spring 90 may form a supporting torsion against the supporting framework 20; when the supporting framework 20 is rotated to the positioning point, the positioning block 42 is pushed and thus the tip portion 43 of the positioning block 42 may be passed through the positioning hole 33 of the fixing base 30 and inserted into the positioning hole 14 of the side plate 11 so as to prevent the supporting framework 20 from springing back.

Figure 2:
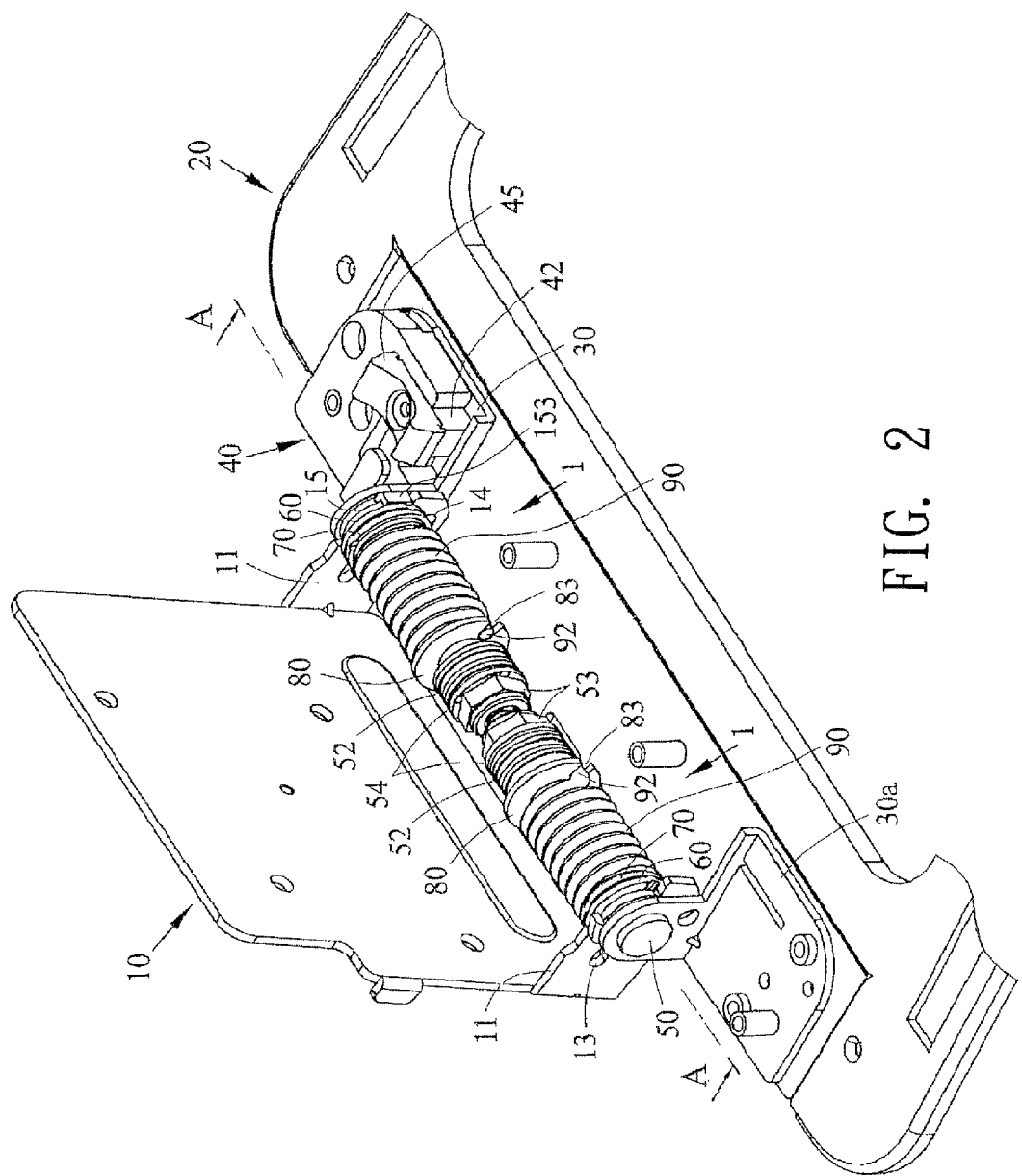
FIG. 2 is a partial perspective assembly view of the one preferred embodiment of the present invention.
Figure 3:
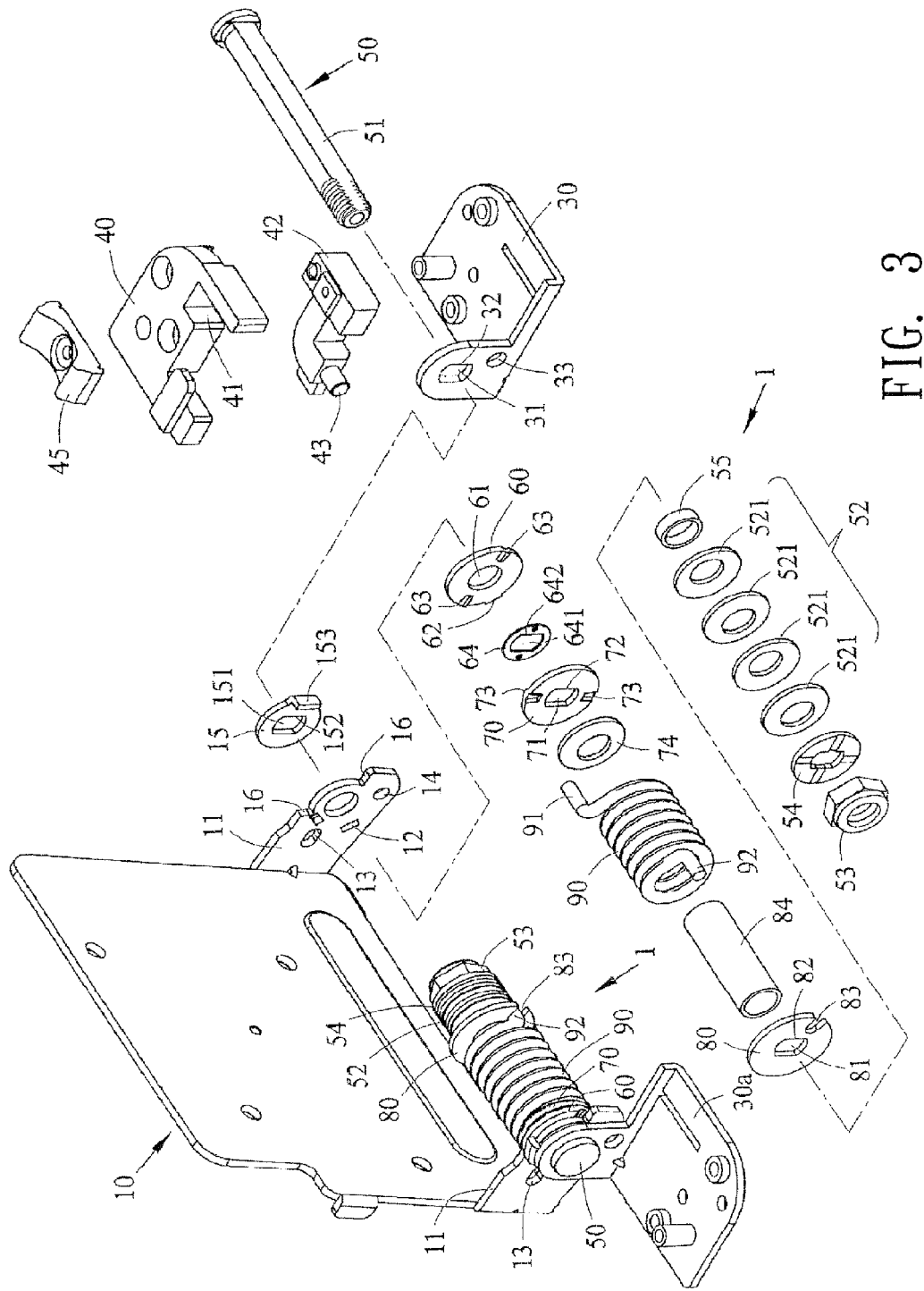
FIG. 3 is the exploded perspective view of the one preferred embodiment of the present invention.

With reference to FIG. 2, the side plates 11 of the connection base 10 are disposed with a stop piece 15, respectively, and the through hole 151 of the stop piece 15 has at least a side edge 152 such that the stop piece 15 may be rotated integratedly with the spindle 50. When the supporting framework 20 is rotated, the stop portion 153 of the stop piece 15 may abut against the two stop portions 16 of the side plate 11 so as to constrain the rotation angle.

Figure 4:
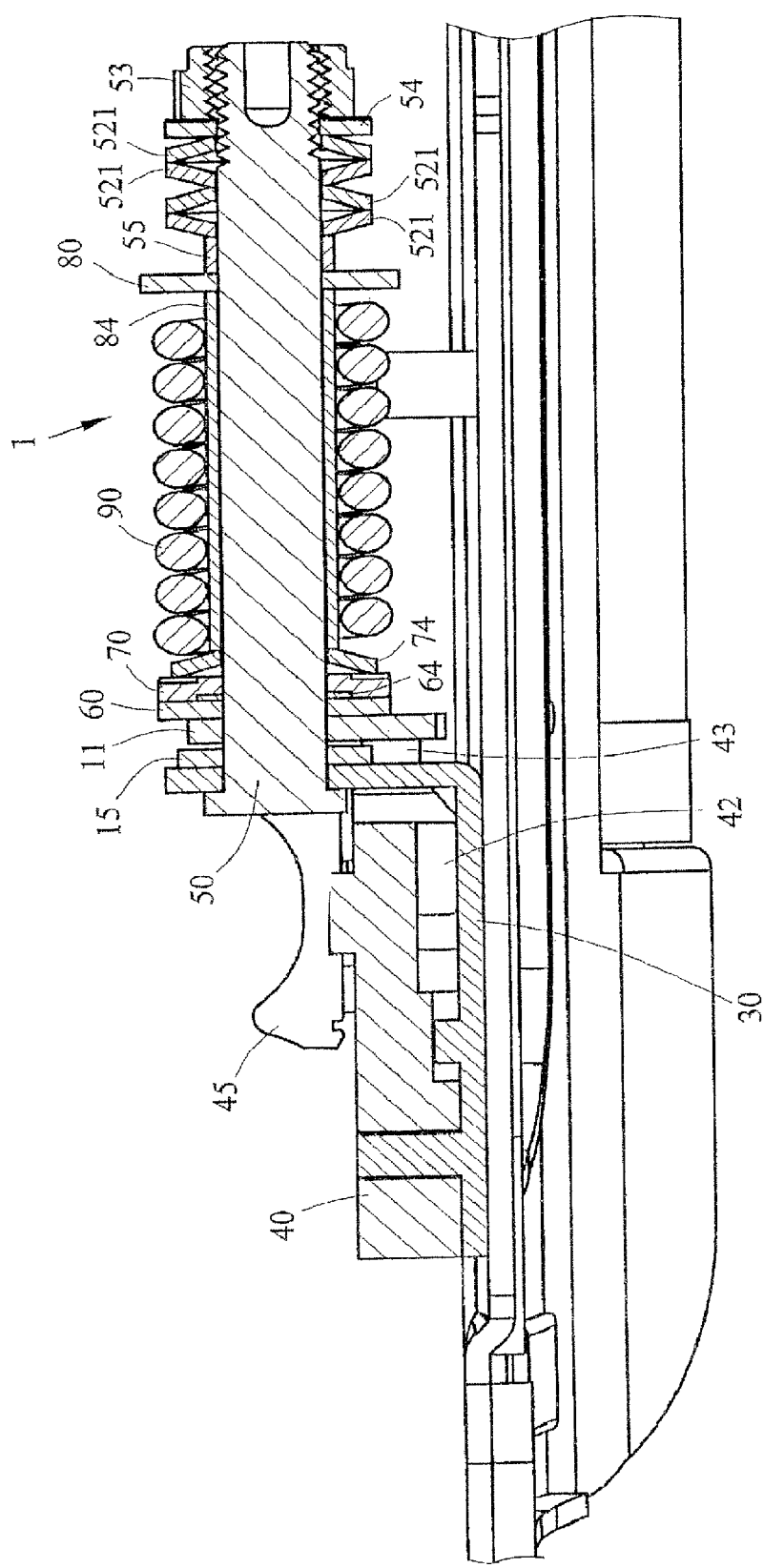
FIG. 4 is a partial, enlarged cross-sectional views taken through the A-A line in FIG. 2.
Figure 5:
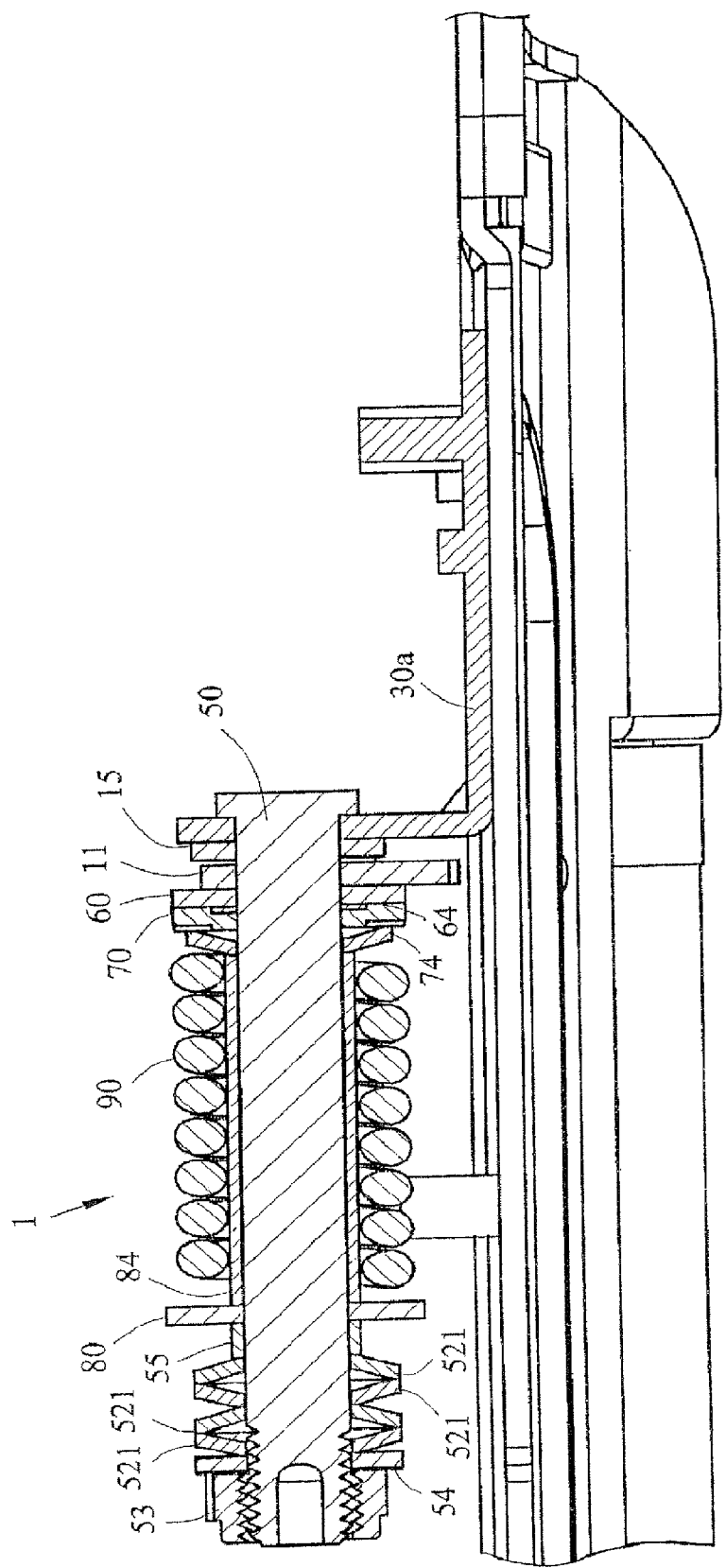
FIG. 5 is another partial, enlarged cross-sectional views taken through the A-A line in FIG. 2.

With reference to FIGS. 4 and 5, the resilient element 52 is a plurality of spring discs 521 or a spring. The spring discs 521 are formed to have arc faces and alternately inserted in opposite faces onto the spindle 50. A gasket 54 is disposed between the resilient element 52 and the nut 53 and a short sleeve 55 is disposed between the resilient element 52 and the spring fixing plate 80. Furthermore, the spindle 50 may be insertingly disposed with a frictional piece 64 and a spring piece 74. The frictional piece 64 is positioned between the first and second locking pieces 60, 70, and the through hole 641 of the frictional piece 64 has at least a side edge 642 such that the frictional piece 64 may be rotated integratedly with the spindle 50. The spring piece 74 is positioned between the second locking piece 70 and the sleeve 84.

Figure 6:
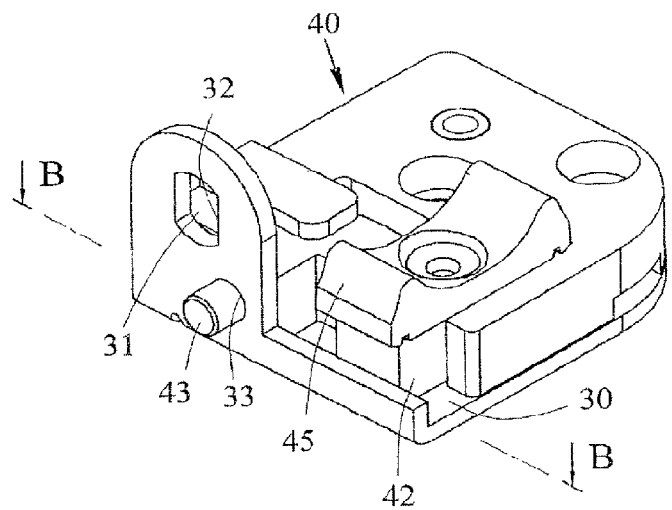
FIG. 6 is a perspective assembly view of the fixing base, positioning block, and cover body of the present invention.
Figure 7:
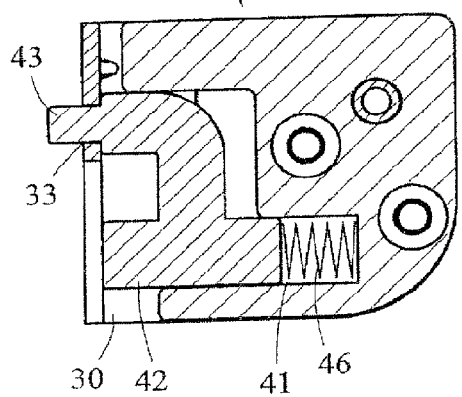
FIG. 7 is the cross-sectional view taken through the B-B line in FIG. 6.
Figure 8:
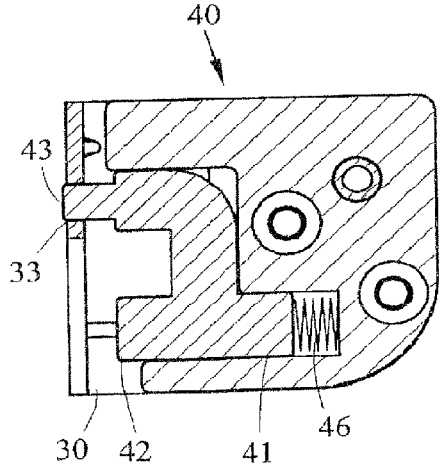
FIG. 8 is an illustrative movement of FIG. 7.

With reference to FIGS. 6 to 8, in one preferred embodiment of the present invention, the positioning block 42 may extend to form a button 45 integratedly or may be fixedly disposed with a button 45 separately. A spring 46 may be disposed inside the guide slot 41 of the cover body 40, and when the supporting framework 20 is rotated to the positioning point, the spring 46 may push the positioning block 42 so as to insert the tip portion 43 of the positioning block 42 into the positioning hole 14 of the side plate 11.

Furthermore, the preferred embodiment of the anti-pinching structure of the present invention may also comprise a connection base 10, a supporting framework 20, a pair of hinge units 1, a cover body 40, a slidable positioning block 42; the connection base 10 has two side plates 11; the supporting framework 20 is disposed with a first and second fixing base 30, 30a; the pair of hinge units 1 may pivot the two side plates 11 onto the first and second fixing bases 30, 30a, respectively; the cover body 40 is fixedly disposed on the first fixing base 30; the slidable positioning block 42 is disposed between the cover body 40 and the first fixing base 30; wherein the spindle 50 of the hinge units 1 may be insertingly disposed on the torsion spring 90 and the spring fixing plate 80, the front end 91 of the torsion spring 90 is embeddedly fixed on the two side plates 11, and the rear end 92 of the torsion spring 90 is embeddedly fixed on the spring fixing plate 80; when the supporting framework 20 is rotated, the first and second fixing bases 30, 30a may drive the spindle 50 and the spring fixing plate 80 to move integratedly; and when the supporting framework 20 is rotated to the positioning point, the tip portion 43 of the positioning block 42 is pushed into the positioning hole 14 of the side plate 11, so as to prevent the supporting framework 20 from springing back.

Figure 9:
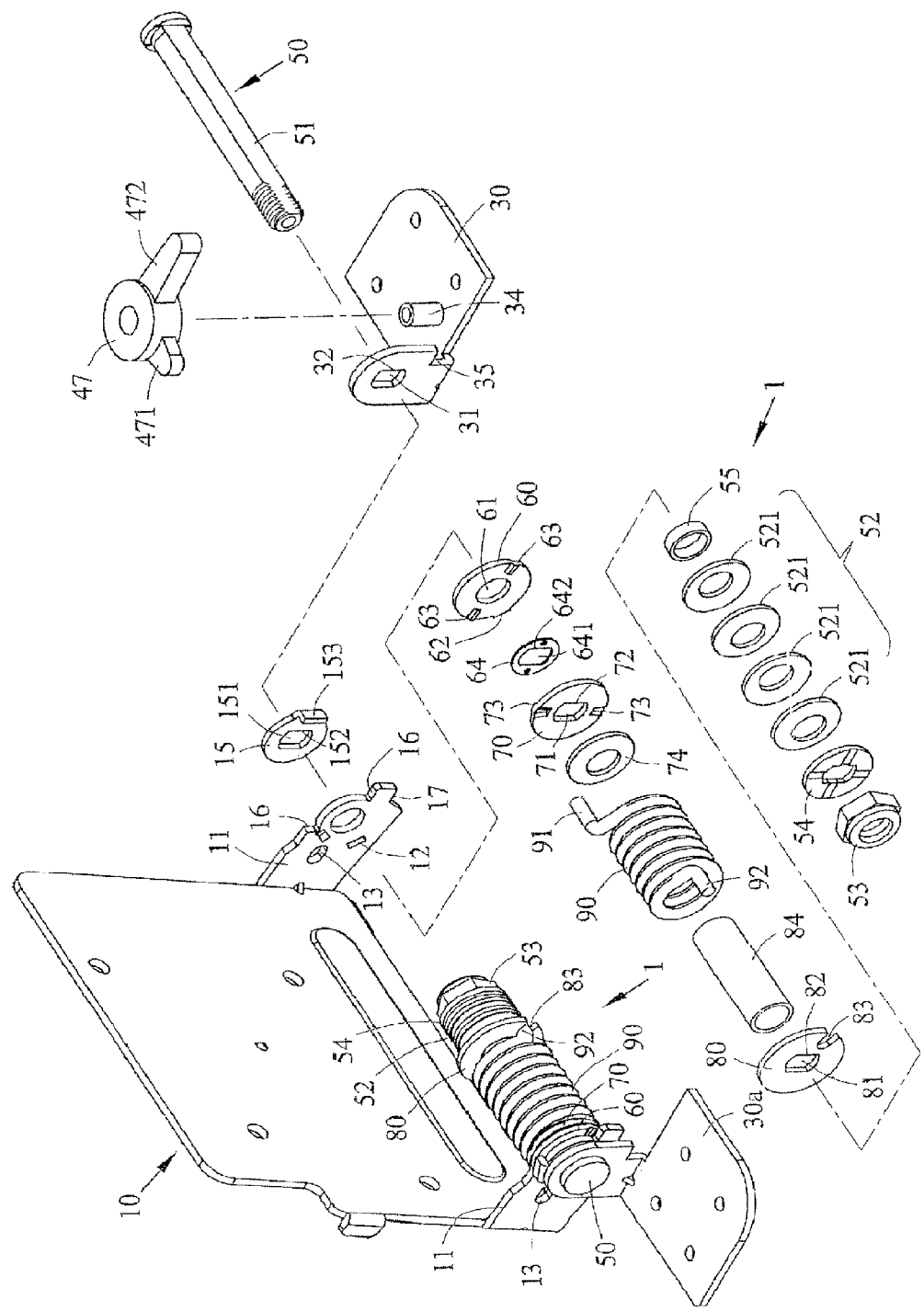
FIG. 9 is a perspective assembly view of the second preferred embodiment of the present invention.
Figure 10:
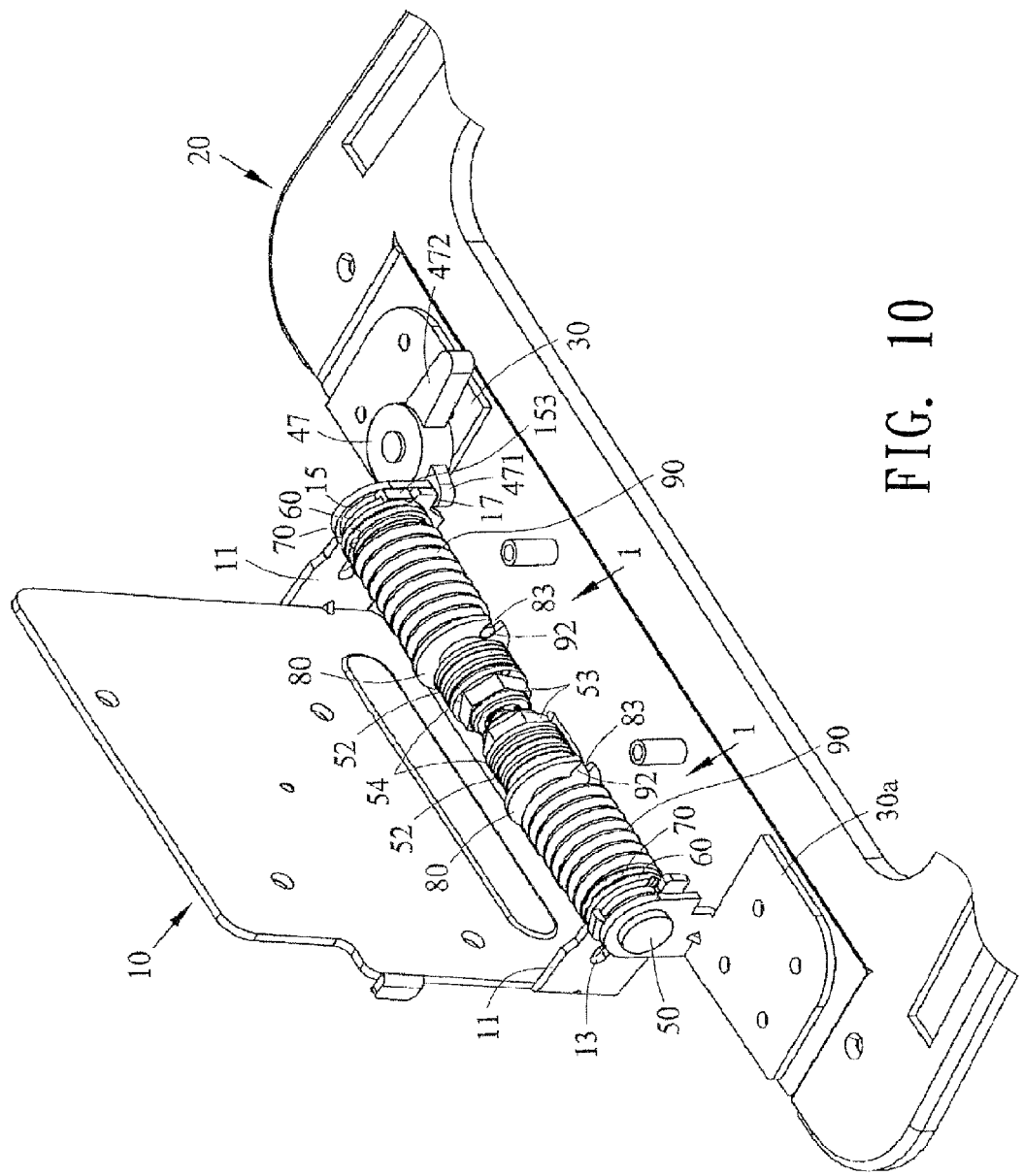
FIG. 10 is a partial perspective assembly view of the second preferred embodiment of the present invention.

With reference to FIGS. 9 and 10, the second embodiment of an anti-pinching structure according to the present invention comprises a connection base 10, a supporting framework 20, a pair of hinge units 1, a rotatable positioning block 47; the connection base 10 has two side plates 11; the supporting framework 20 is disposed with a first and second fixing base 30, 30a; the pair of hinge units 1 may pivot the two side plates 11 onto the first and second fixing bases 30, 30a, respectively; the rotatable positioning block 47 is pivoted onto the cylinder 34 of the first fixing base 30 (the positioning block 47 may be embodied as rivet or screw pivoted thereon); wherein the spindle 50 of the hinge units 1 may be insertingly disposed on the torsion spring 90 and the spring fixing plate 80, the front end 91 of the torsion spring 90 is embeddedly fixed on the two side plates 11, and the rear end 92 of the torsion spring 90 is embeddedly fixed on the spring fixing plate 80; when the supporting framework 20 is rotated, the first and second fixing bases 30, 30a may drive the spindle 50 and the spring fixing plate 80 to move integratedly; and when the supporting framework 20 is rotated to the positioning point, the positioning block 47 is poked and thus the protrusion 471 of the positioning block 47 is inserted into the positioning notch 35 of the first fixing base 30 and the positioning notch 17 of the side plate 11 so as to prevent the supporting framework 20 from springing back. The positioning block 47 may protrude to form a poke rod 472.

While the invention has been described with reference to the a preferred embodiment thereof, it is to be understood that modifications or variations may be easily made without departing from the spirit of this invention, which is defined by the appended claims.

What is claimed is:

1. An anti-pinching structure for a supporting frame comprising:
    a first fixing base fixedly disposed on a supporting framework and a through hole of the first fixing base having at least a side edge;
    a positioning block pivoted on the first fixing base and having a protrusion;
    a spindle disposed with at least a flat surface and insertingly disposed on the first fixing base and a side edge of a connection base;
    a first locking piece embeddedly fixed on a side plate of the connection base and having a round hole for the insertion of the spindle;
    a second locking piece insertingly disposed on the spindle and a through hole of the second locking piece having at least a side edge;
    a spring fixing plate insertingly disposed onto the spindle and a through hole of the spring fixing plate having at least a side edge;
    a sleeve insertingly disposed on the spindle and positioned between the second locking piece and the spring fixing plate; and
    a torsion spring insertingly disposed on the sleeve and front and rear ends of the torsion spring embeddedly fixed, respectively, on the side plate of the connection base and on the spring fixing plate;
    wherein an end of the spindle is inserted through a resilient element and connected to a nut, and the resilient element impelling the spring fixing plate and sleeve to prompt the second locking piece to intimately contact with the first locking piece; consequently, when the supporting framework is folded, two protrusions of the second locking piece constrain two protrusions of the first locking piece so as to form a locking status;
    when the supporting framework is spread from a folded status, the two protrusions of the second locking piece cross the two protrusions of the first locking pieces and thus disengage from the locking status and the torsion spring forming a supporting torsion against the supporting framework; when the supporting framework is rotated to a positioning point, the positioning block is poked and thus the protrusion of the positioning block is inserted into a positioning notch of the first fixing base and a positioning notch of the side plate so as to prevent the supporting framework from springing back.

2. The anti-pinching structure for the supporting frame as defined in claim 1, wherein the positioning block is pivoted by rivet or screw onto the first fixing base and the positioning block protruding to form a poke rod.

3. The anti-pinching structure for the supporting frame as defined in claim 1, wherein the side plate of the connection base is disposed with a stop piece which is rotated integratedly with the spindle and when the supporting framework is rotated, the stop piece abutting against the stop portion of the side plate so as to constrain a rotation angle.

4. The anti-pinching structure for the supporting frame as defined in claim 1, wherein the resilient element is a plurality of spring discs or a spring and the spring discs are formed to have arc faces and alternately inserted in opposite faces onto the spindle, and a gasket is disposed between the resilient element and the nut and also a short sleeve is disposed between the resilient element and the spring fixing plate.

5. The anti-pinching structure for the supporting frame as defined in claim 1, wherein the spindle is insertingly disposed with a frictional piece and a spring piece, the frictional piece is positioned between the first and second locking pieces, and a through hole of the frictional piece has at least a side edge such that the frictional piece is rotated integratedly with the spindle, and the spring piece is positioned between the second locking piece and the sleeve.

6. An anti-pinching structure for a supporting frame comprising:
    a connection base having two side plates;
    a supporting framework disposed with a first and second fixing base;
    a pair of hinge units pivoting the two side plates of the connection base onto the first and second fixing bases, respectively; and
    a rotatable positioning block pivoted onto the first fixing base;
    wherein a spindle of the hinge units is insertingly disposed onto a torsion spring and a spring fixing plate, a front end of the torsion spring is embeddedly fixed on one of the two side plates of the connection base, and a rear end of the torsion spring is embeddedly fixed on the spring fixing plate; when the supporting framework is rotated, the first and second fixing bases drive the spindle and the spring fixing plate to rotate; and when the supporting framework is rotated to a positioning point, the positioning block is poked and thus a protrusion of the positioning block is inserted into a positioning notch of the first fixing base and a positioning notch of one of the two side plates of the connection base so as to prevent the supporting framework from springing back.

7. The anti-pinching structure for the supporting frame as defined in claim 6, wherein the side plate of the connection base is disposed with a stop piece which is rotated integratedly with the spindle and when the supporting framework is rotated, the stop piece abutting against two stop portions of one of the two side plates so as to constrain a rotation angle.

* * * * *